(12) United States Patent  
Dougherty (10) Patent No.: US 8,381,430 B1  
(45) Date of Patent: Feb. 26, 2013

(54) FISHHOOK DISGORGER

(75) Inventor: Richard A. Dougherty, Hummelstown, PA (US)

(73) Assignee: 1000 West, Inc., Hershey, PA (US)

( * ) Notice: Subject to any disclaimer, the term of this patent is extended or adjusted under 35 U.S.C. 154(b) by 546 days.

(21) Appl. No.: 12/592,955

(22) Filed: Dec. 7, 2009

(51) Int. Cl.  
*A01K 97/00* (2006.01)

(52) U.S. Cl. ........................................ 43/53.5

(58) Field of Classification Search .............. 43/53.5  
See application file for complete search history.

(56) References Cited

U.S. PATENT DOCUMENTS

| | | | | |
|---|---|---|---|---|
| 2,054,236 A * | 9/1936 | Behr | | 43/53.5 |
| 2,578,289 A * | 12/1951 | Danielson | | 43/53.5 |
| 2,619,859 A * | 12/1952 | Peronto | | 43/53.5 |
| 2,795,887 A | 6/1957 | Lockert | | 43/53.5 |
| 2,836,004 A * | 5/1958 | Stader | | 43/53.5 |
| 3,451,157 A | 6/1969 | Jones | | 43/53.5 |
| 3,869,822 A * | 3/1975 | Tieman | | 43/53.5 |
| 4,590,702 A | 5/1986 | Chestnutt | | 43/53.5 |
| 5,307,586 A * | 5/1994 | Palmer | | 43/53.5 |
| 5,983,555 A * | 11/1999 | Biel | | 43/53.5 |
| 6,397,512 B1 * | 6/2002 | Chang | | 43/53.5 |
| 6,766,609 B1 * | 7/2004 | Aboczky | | 43/53.5 |
| 7,117,630 B1 * | 10/2006 | Messerschmidt | | 43/53.5 |

* cited by examiner

*Primary Examiner* — Christopher P Ellis  
(74) *Attorney, Agent, or Firm* — Charles M. Kaplan (57) ABSTRACT

A fishhook disgorger and method of disgorging employ a pair of opposed, widely-spaced, rotating jaws having surfaces configured to grip and hold a fishhook or lure. The jaws are pivotally connected to each other, and a hand operated mechanism uses links and hingepins to draw the jaws toward each other for clasping an impaled fishhook or portion of a fish lure therebetween. The disgorger clasping force may be increased by extending linked elements at an angle to the surfaces configured to hold a fishhook or lure.

13 Claims, 7 Drawing Sheets

FIG. 7

FISHHOOK DISGORGER

BACKGROUND OF THE INVENTION

This invention relates to hand operated fishing tackle usable by anglers to disengage fishhooks and fishing lures from the jaw, gullet, gills, throat or mouth of a fish without endangering the user from the teeth or fins of the fish.

Prior disgorgers usually required their fishhook engaging parts to slide linearly in a straight line toward each other. The result often was that they were not readily usable to extract hooks from a number of different fish species or sizes, and some were not sturdy enough to be usable to disgorge hooks and lures from large, heavy fish. Others could not be used to grasp a wide variety lures and hooks of varying sizes, or required the user to have a strong grip. The prior disgorgers and disgorging methods often caused fatal or serious damage to delicate parts of a fish's anatomy.

OBJECTIVES OF THE INVENTION

Accordingly, it is an object of this invention to provide improved fishhook disgorgers and methods of disgorging.

Another object is to provide fishhook disgorgers that have fishhook engaging jaws that do not slide linearly toward each other when they grasp a fishhook or lure.

An additional object is to provide hand operated disgorgers that employ leveraged parts which enables these disgorgers to be comfortably used by anglers not having strong hands.

Another object is to provide disgorgers with widely spaced apart jaws that can grasp fishhooks and lures of varying and large sizes.

A further object is to provide fishhook disgorgers with jaws that pivot or rotate toward each.

An additional object is to provide disgorgers and methods of disgorging that minimize injury to fish and reduce damage to the anatomy of the fish being disgorged.

A further object is to provide fishing tackle and disgorgers that are rugged, economical, easy and safe to use, and which do not possess defects found in similar prior art fishing tackle.

A further object is to provide improved methods for disgorging or removing a fishhook or fishing lure from a fish.

Other objects and advantages of the fishing tackle and disgorgers and methods incorporating this invention will be found in the specification and claims and the scope of the invention will be set forth in the claims.

DESCRIPTION OF THE INVENTION

The drawing shows fishing tackle in the form of a fishhook disgorger 5 capable of removing a fishhook 6 from the mouth 4 of a fish 7 and for cutting a fishing line 8. The fishhook disgorger 5 may have an operating mechanism employing a first hollow, circular, cylindrical tube 10 having a pair of aligned, identical, longitudinal slots 11 and 12 adjacent its rear end 13, and a transversely extending hand grip 15 is affixed to end 13. The front end 14 of tube 10 terminates in a radially extending, circular peripheral abutment 16 that surrounds end 14. A circular, cylindrical shaft 17 is enclosed in tube 10, and the shaft 17 is slidable longitudinally within the tube. A pair of identical, aligned, separated shelves 18 and 19 protrude from the front end 20 of shaft 17 and extend beyond the front end 14 of tube 10.

A fingerpull 22 has a second hollow circular cylindrical tube 23 enclosing a portion of tube 10. Finger engagable handles 25 extend transversely from tube 23 in general alignment with hand grip 15. The ends of a rod 26 are anchored in opposite surfaces of tube 23. The rod 26 passes through slots 11 and 12 and is attached to shaft 17 adjacent its rear end 21, and rod 26 is movable longitudinally with shaft 17 when the fingerpull 22 is moved toward or away from the hand grip 15.

A hollow generally cylindrical cap 30 has a bifurcated front end 31 defining longitudinally extending ledges 32 and 33, and a threaded, circular cylindrical rear end 34. Cap 30 is removably connected to tube 10 by a threaded circular ring 35 circumscribing the front end 14 of tube 10. The threads on ring 35 engage the threads on cap 30 so as to pull and hold end 34 against one surface of abutment 16, while the inside of ring 35 is held against the opposite surface of the abutment.

Fishhook disgorger 5 may include a fishhook gripping mechanism 40 that employs a first member or jaw 41 having a front end 42 and an angularly extending rear end 43, and a mating second member or jaw 44 that has a front end 45 and an angularly extending rear end 46. Jaws 41 and 44 are pivotally attached to each other, intermediate their ends, inside of cap 30 by a first hinge pin 47 that is anchored in ledges 32 and 33. Adjacent their front ends 42 and 45, the jaws 41 and 44 have widely-spaced, aligned, mating fishhook gripping surfaces 50 and 51 that may include one or more pairs of differently sized, mating, circular indentations 52 to enable them to grasp a variety of types of fishhooks and lures of many different sizes. Jaws 41 and 44 may also have aligned sharpened edges 53 and 54 for cutting fishing line or for excising an imbedded fishhook or lure.

Extending from its front end 42 toward hinge pin 47 and including gripping surface 50, the jaw 41 has a predetermined first thickness that terminates in a cliff 55; extending from its front end 45 toward hinge pin 47 and including gripping surface 51, jaw 44 has a corresponding predetermined first thickness that terminates in a corresponding cliff 56. Extending from its rear end 43 toward hinge pin 47, jaw 41 has a predetermined second thickness that terminates at cliff 55 and defines an angled, force-multiplying, first lever arm 57; extending from its rear end 46 toward hinge pin 47, jaw 44 has a corresponding second thickness that terminates in at cliff 56 and defines an angled, force-multiplying, second lever arm 58. The second thickness of the lever arms 57 and 58 is reduced to about half the first thickness of the jaws 41 and 44, and the lever arms 57 and 58 each extend at an obtuse angle (e.g. 150-160 degrees) to the fishhook gripping surfaces 50 and 51 of their respective jaws. The reduction in thickness of the lever arms 57 and 58 enable the jaws 41 and 44 to cross and overlay each other, and pivot, or rotate, around the same hingepin 47, and also enable the surfaces 50 and 51 and the edges 53 and 54 to mate in the manner described.

A first link 59 having a front end 60 is pivotally connected by a second hinge pin 61 to the rear end 43 of first jaw 41, and a second link 62 having a front end 63 is pivotally connect by a third hingepin 64 to the rear end 46 of second jaw 44. The rear end 65 of link 59 and the rear end 66 of link 62 are pivotally connected to each other by a fourth hingepin 67, which is connected to the shelves 18 and 19 at the front end 20 of shaft 17.

Figure 1:
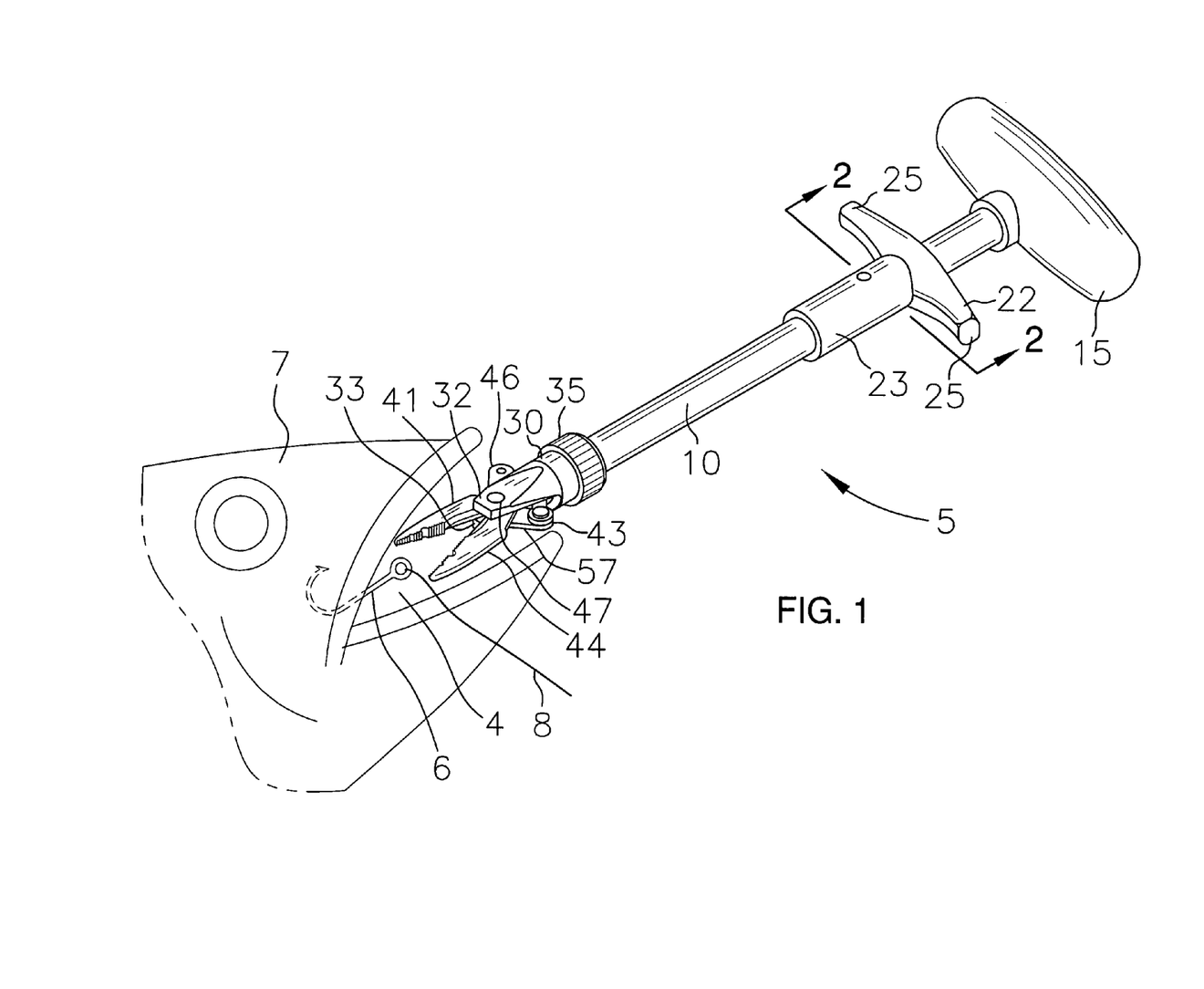
FIG. 1 is a perspective, partially schematic view of an embodiment of a fishhook disgorger in accord with this invention.
Figure 2:
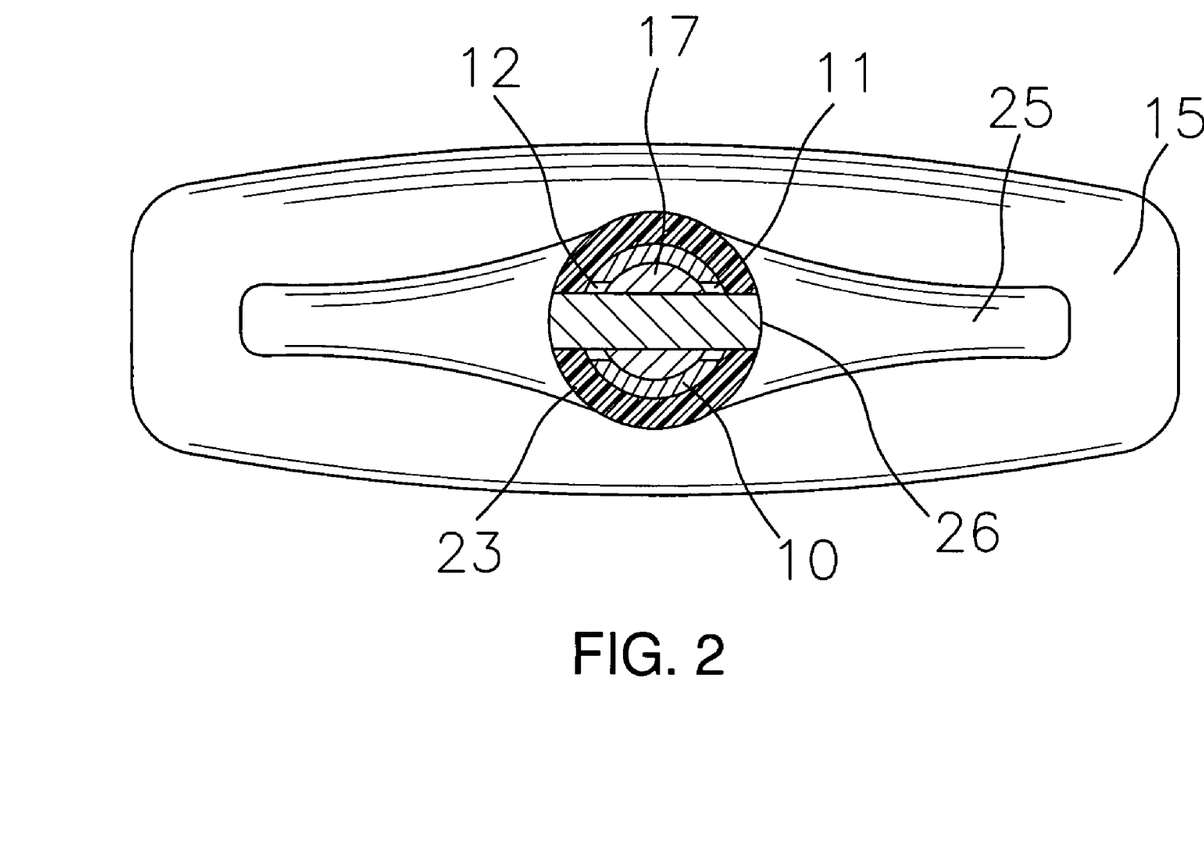
FIG. 2 is an enlarged a cross sectional view taken along the line 2-2 in FIG. 1.
Figure 3:
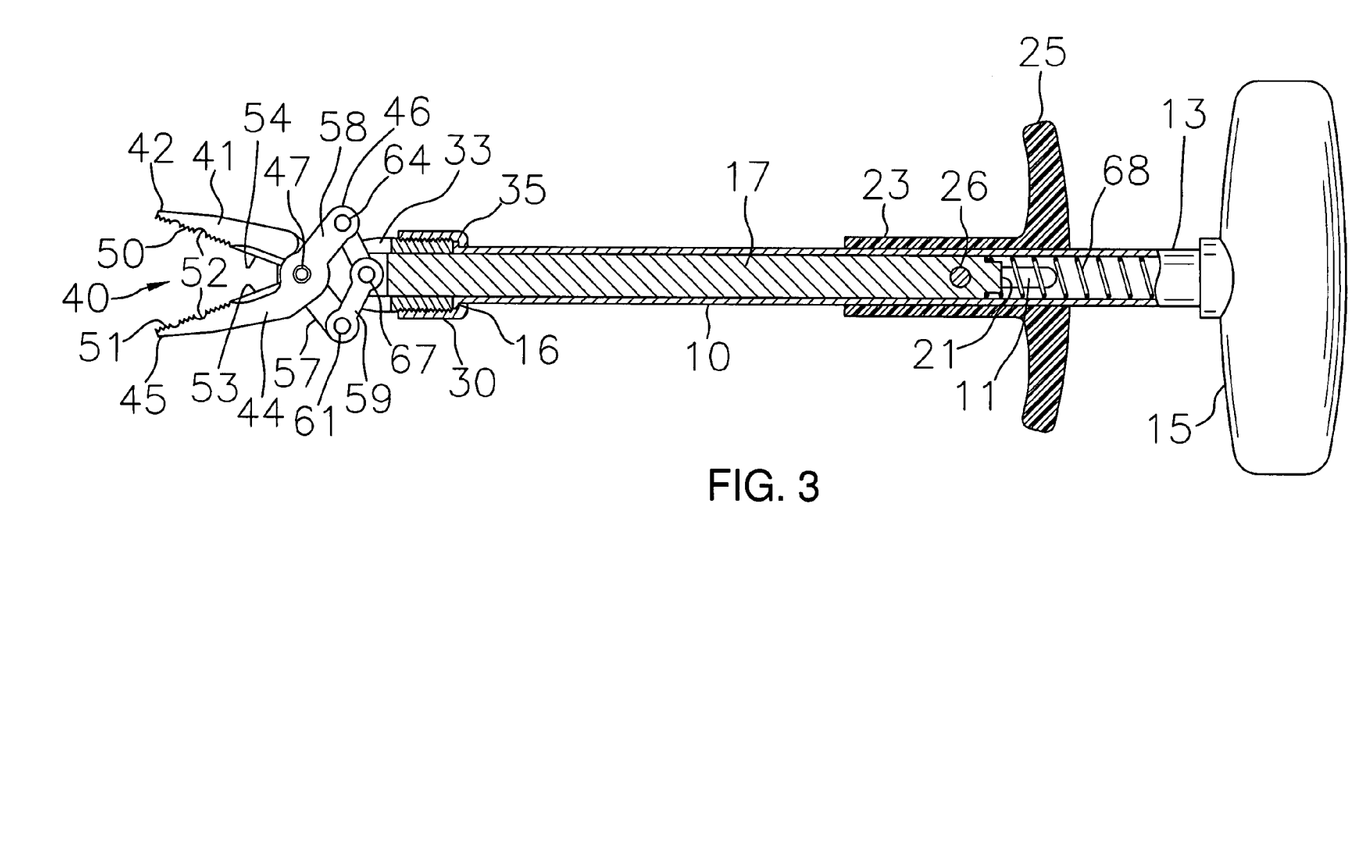
FIG. 3 is a partial cross sectional view showing the jaws open.
Figure 4:
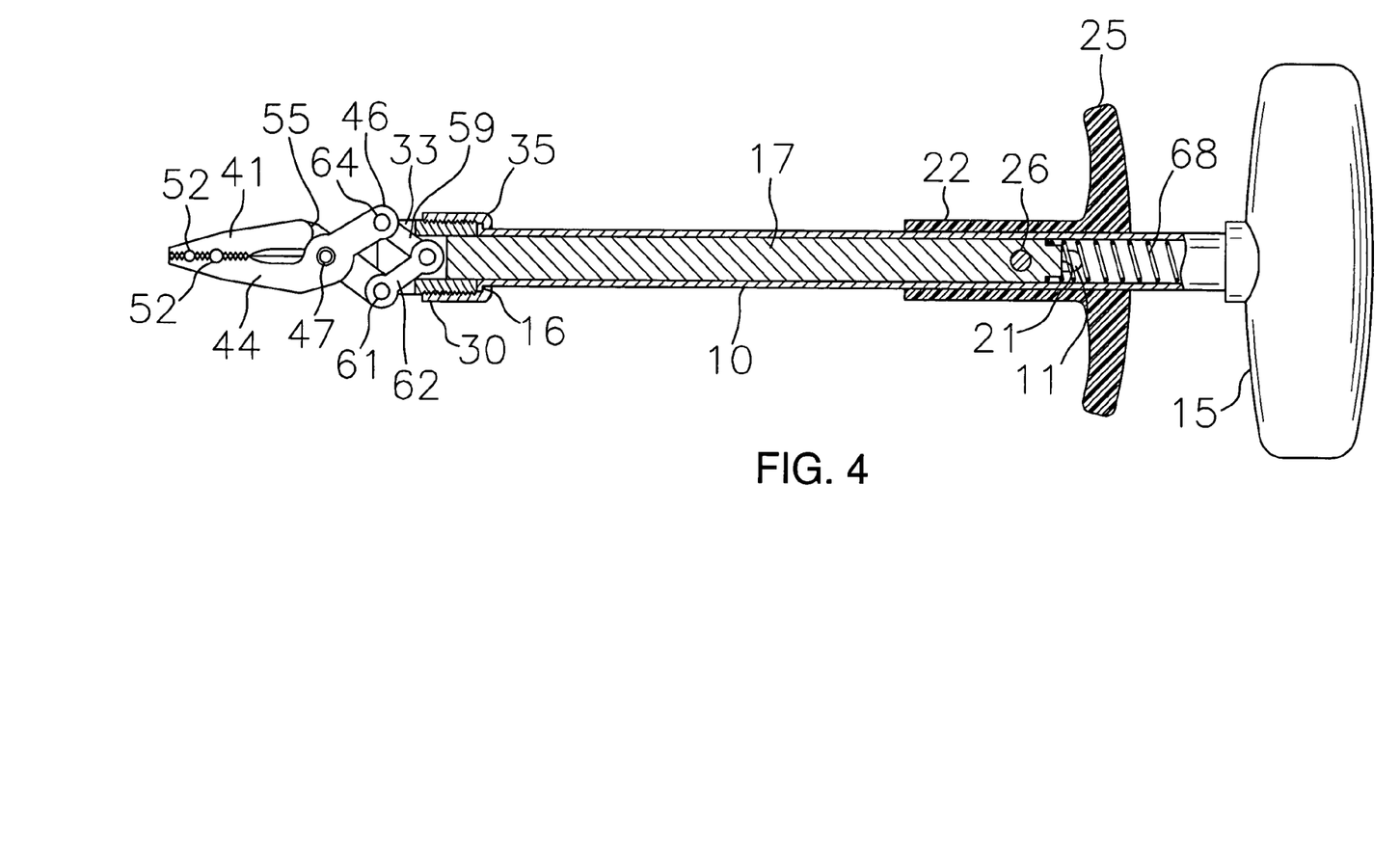
FIG. 4 is a partial cross sectional view corresponding to FIG. 3 showing the jaws closed.
Figure 5:
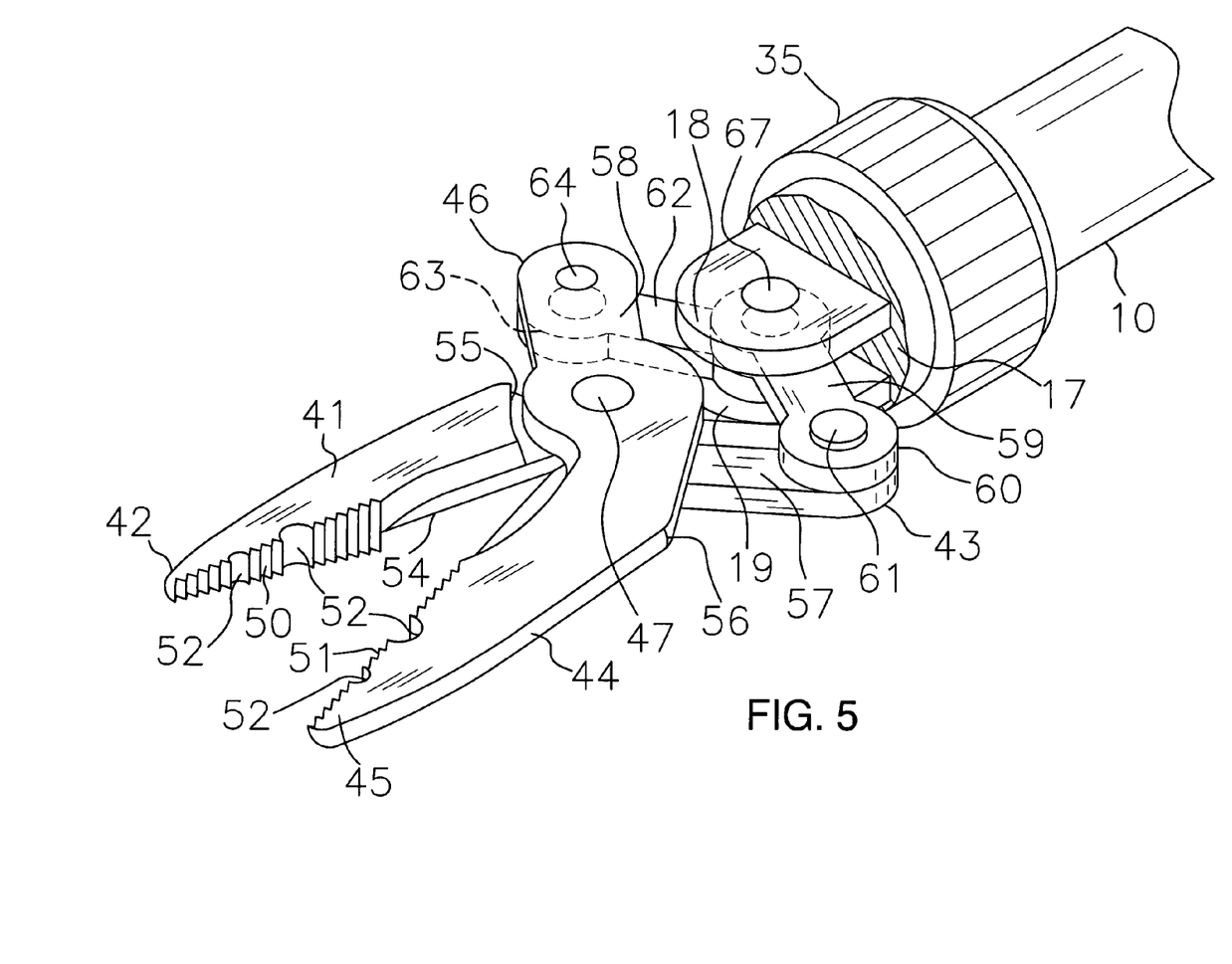
FIG. 5 an enlarged, perspective view of the jaws and links with parts broken away.
Figure 6:
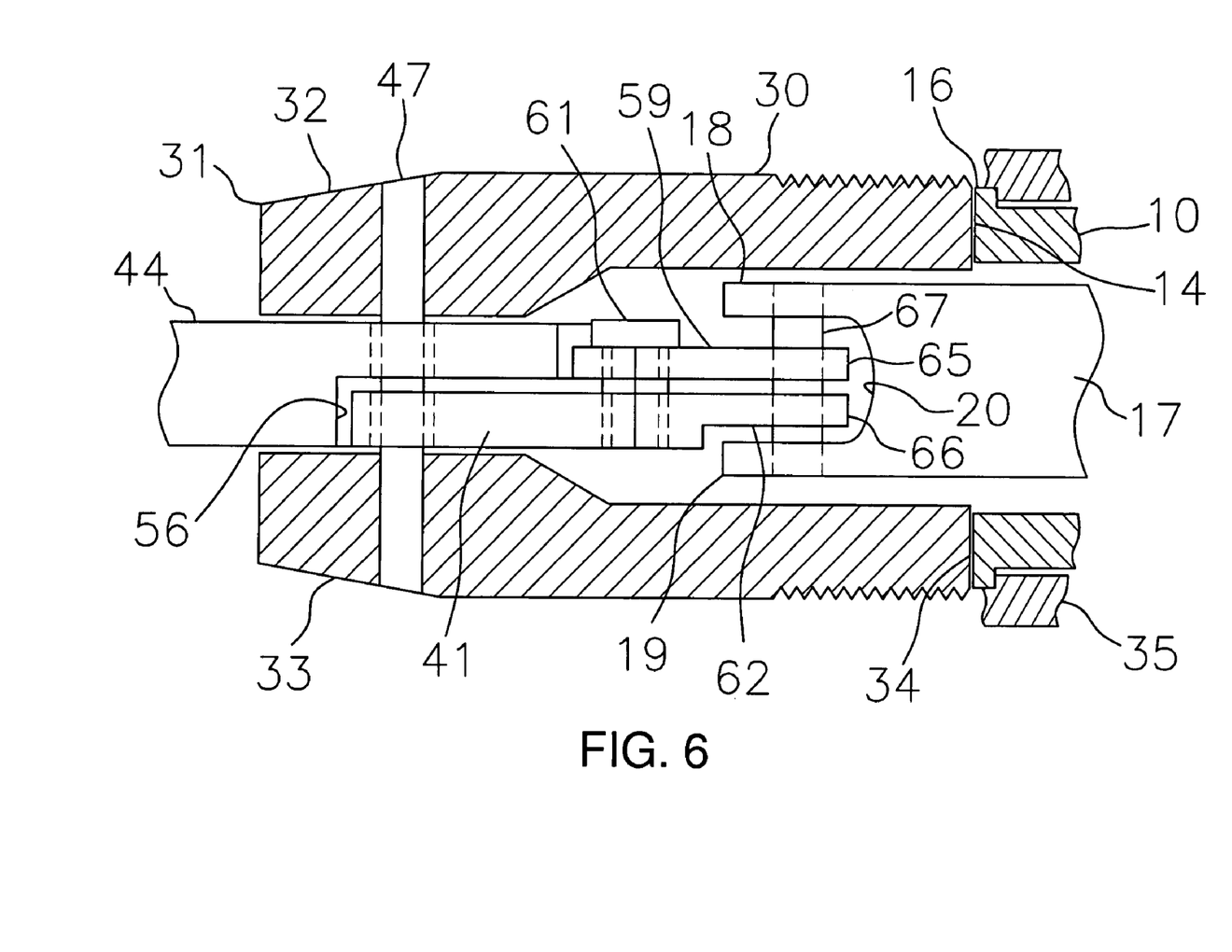
FIG. 6 is an enlarged, partially broken away, partially cross sectional side view.

A coil spring 68 bearing against the rear end 21 of shaft 17 normally urges the jaws 41 and 44 into open position, as shown in FIGS. 1, 3 and 5. When an angler squeezes fingerpull 22 toward hand grip 15 against the resistance of spring 68, shaft 17 is drawn toward the rear end 13 of tube 10, and this pulls the rear ends 65 and 66 of links 59 and 62 rearwardly away from hinge pin 47 towards the handgrip 15 and rotates the links around hingepin 67. The rearward and rotating movement of links 59 and 62 also pulls the rear end 43 of jaw 41 and the rear end 46 of jaw 44 towards each other and rearwardly toward handgrip 15 and further away from hingepin 47; this causes the jaws 41 and 44 to rotate, or pivot, around hingepin 47 toward each other in an arcuate path 70 into the closed position shown in FIGS. 4 and 7, where the jaws can grip a fishhook between surfaces 50 and 51, and bring together sharpened edges 53 and 54 for cutting fishing line or for excising an imbedded fishhook. The lever arms 57 and 58 extending at obtuse angles to the gripping surfaces 50 and 52 and cutting edges 53 and 54 multiply the angler's hand's force and the pressure exerted by the gripping surfaces and cutting edges; this enables the disgorger 5 to be used by anglers not having strong hands. The pivoting or rotating, instead of sliding linear, movement of jaws 41 and 44 can reduce damage or injury to fish by enabling the widely-spaced jaws to clasp portions of fishhooks, or the larger portions of fish lures, not reachable or graspable by linearly moving jaws. Fish injury can also be reduced by using edges 53 and 54 to cut a fishing line when the hook and line should be removed separately.

Figure 7:
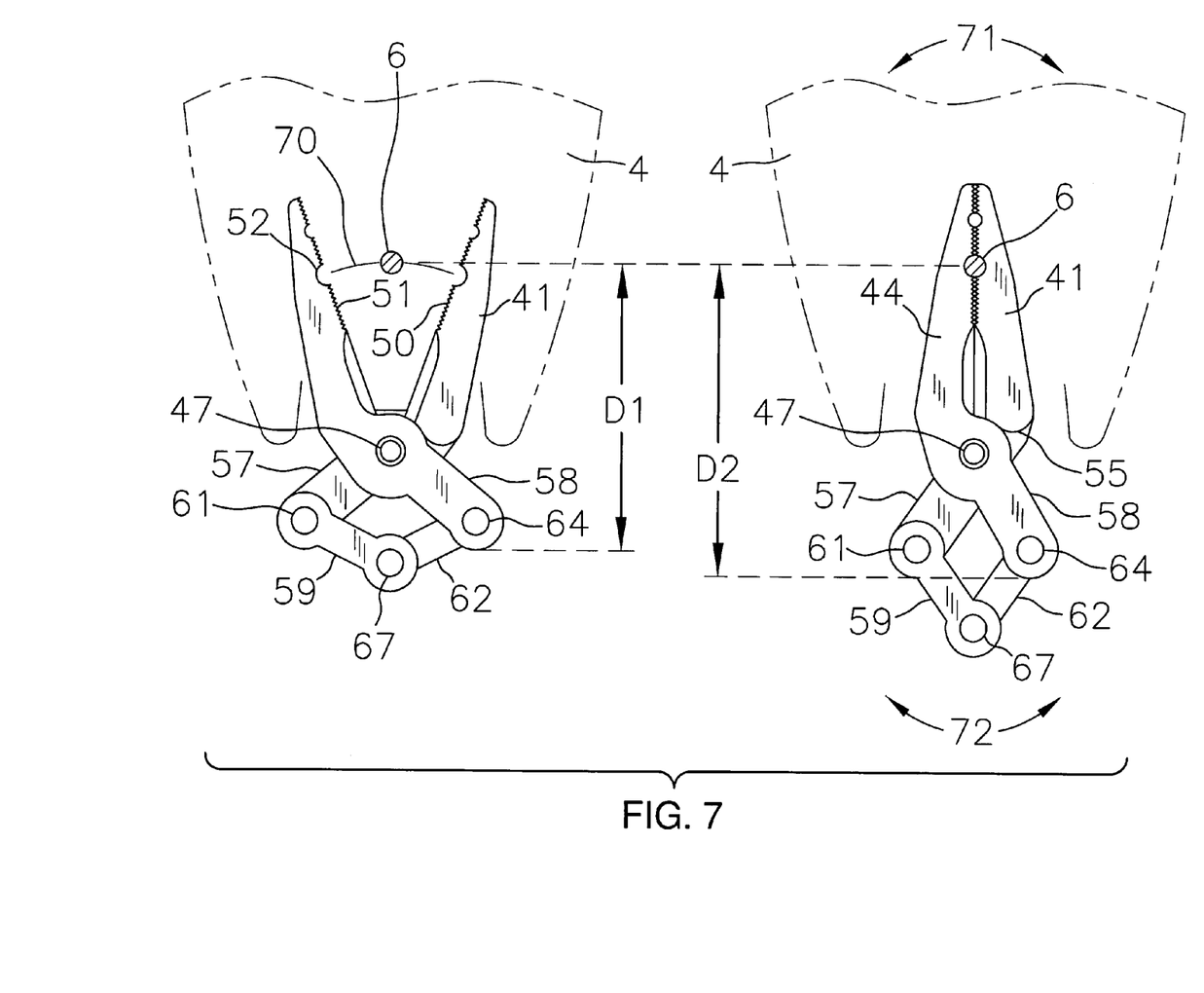
FIG. 7 is a plan, partially schematic view illustrating a fishhook disgorging method in accord with this invention.

This invention also includes methods of disgorging a lure or a fishhook 6 from the mouth 4 of a fish in which the fishhook 6 is impaled, as shown in FIGS. 1 and 7. A pair of mating pivotable members or jaws 41 and 44 are inserted into the mouth 4 of the fish that is impaled by the fishhook 6. The pivotable members 41 and 44 are then moved to a position where a portion of the impaled fishhook 6 is located between the pivotable members 41 and 44. The pivotable members 44 and 41 are then moved, or rotated, toward each other around a common axis defined by hingepin 47 along an arcuate path 70 that intersects the fishhook 6, until a surface 51 and 52 of each pivotable member engages a portion of the fishhook so as to clasp the fishhook between the pivotable members. The pivotable members are then moved in a way (indicated by arrows 71 and 72) that disimpales the fishhook from fish. The pivotable members with the disimpaled fishhook clasped therebetween are then withdrawn from the mouth of the fish.

The pivotable members 41 and 44 can be pivoted, or rotated, toward each other until they close on, or clasp, a fishhook or lure by using links 59 and 62 and hingepin 67 for linking together their ends 43 and 46 and moving the ends 43 and 46 of the pivotable members to a distance D2 that is farther away from the fishhook than distance D1 occupied when the jaws of the pivotable members were wide open. The hand gripping force of the angler and the fishhook clasping force exerted by the surfaces 51 and 52 can be increased, or multiplied, by extending each of the force-multiplying lever arms 57 and 58 beyond hingepin 67 at an obtuse angle to the respective fishhook engaging surface 51 or 52 of its respective pivotable member.

While the present invention has been described with reference to particular embodiments, it is not intended to illustrate or describe all of the equivalent forms or ramifications thereof. Also, the words used are words of description, or of relative orientation of the parts, rather than limitation, and various changes may be made without departing from the spirit or scope of the invention disclosed herein. It is intended that the appended claims cover all such changes as fall within the true spirit and scope of the invention.

I claim:

1. A fishhook disgorger, comprising: a pair of aligned opposed jaws having front and rear ends and each jaw having a surface configured to hold a fishhook, said jaws being pivotally connected to each other by a hinge pin intermediate their ends, and a hand operated mechanism that pivots said jaws toward each other around said hinge pin so as to grip a fishhook therebetween with the configured surfaces, said hand operated mechanism comprising a first hollow cylindrical tube having a pair of aligned longitudinal slots adjacent one of its rear end, a transversely extending hand grip affixed to said rear end, a cylindrical shaft enclosed in said first tube, said shaft being slidable longitudinally within said first tube, a fingerpull comprising a second hollow cylindrical tube enclosing a portion of said first tube, finger engagable handles extending from said second tube in general alignment with said hand grip, a rod having its ends anchored in opposite surfaces of said fingerpull, said rod passing through said slots in said first tube and being attached to and movable with said shaft when said fingerpull is moved toward said hand grip, and means connecting said shaft to said pair of pivotable jaws.

2. A fishhook disgorger, comprising: a pair of aligned opposed jaws having front and rear ends and each jaw having a surface configured to hold a fishhook, said jaws being pivotally connected to each other by a hinge pin intermediate their ends, and a hand operated mechanism that pivots said jaws toward each other around said hinge pin so as to grip a fishhook therebetween with the configured surfaces, said hand operated mechanism comprising a hollow cylindrical tube, a cylindrical shaft enclosed in said tube and slidable longitudinally within said tube, hand operated means connected to said shaft for sliding said shaft in said tube, and means connecting said shaft to said rear ends of said jaws, a first link having a front end pivotally connected to the rear end of one of said jaws, and a second link having a front end pivotally connect to the rear end of the other of said jaws, said first and second links each having a rear end pivotally connected to said shaft.

3. A fishhook disgorger as defined in claim 2, further comprising: said shaft having a pair of aligned separated shelves protruding from its front end, said shelves extending beyond said tube, and a hinge pin pivotally connecting said rear ends of said links to said shelves.

4. A fishhook disgorger as defined in claim 3, further comprising: a hollow cylindrical cap having a bifurcated front end and a rear end removably connected to the front end of said tube; a pair of aligned separated shelves protruding from the front end of said shaft beyond said front end of said tube and into said cap, a first link having a front end pivotally connected to the rear end of one of said jaws, a second link having a front end pivotally connect to the rear end of the other of said jaws, and a hinge pin pivotally connecting the rear ends of said links to said shelves within said cap.

5. A fishhook disgorger as defined in claim 4, further comprising: said rear end of said cap being threaded, a threaded circular ring circumscribing said front end of said tube and engaging the threads on said cap so as to connect said cap to said tube, and said hinge pin connecting said jaws being anchored in said cap.

6. A fishhook disgorger as defined in claim 5, further comprising: said front end of said tube terminating in a peripheral abutment surrounding its front end and said circular ring contacting one surface of said abutment and holding said end cap against an opposite surface said abutment.

7. A fishhook disgorger, comprising: a pair of aligned opposed jaws having front and rear ends and each jaw having a surface configured to hold a fishhook, said jaws being pivotally connected to each other by a hinge pin intermediate their ends, and a hand operated mechanism that pivots said jaws toward each other around said hinge pin so as to grip a fishhook therebetween with the configured surfaces, said jaws having aligned fishhook gripping surfaces with a predetermined first thickness adjacent their front ends, each of said jaws having a predetermined second thickness adjacent its rear end, said second predetermined thickness being less than said first predetermined thickness so as to enable said jaws to cross and overlay each other, a first link having a front end pivotally connected to the rear end of one of said jaws, and a second link having a front end pivotally connect to the rear end of the other of said jaws, said first and second links each having a rear end pivotally connected to said hand operated mechanism.

8. A fishhook disgorger, comprising:
(A) an operating mechanism comprising:
a first hollow cylindrical tube having a pair of aligned longitudinal slots adjacent its rear end, a transversely extending hand grip affixed to said rear end, a cylindrical shaft enclosed in said first tube, said shaft being slidable longitudinally within said first tube, a pair of aligned separated shelves protruding from the front end of said shaft beyond the front end of said first tube;
a fingerpull comprising a second hollow cylindrical tube enclosing a portion of said first tube, finger engagable handles extending transversely from said second tube in general alignment with said hand grip,
a rod having its ends anchored in opposite surfaces of said second tube, said rod passing through said slots in said first tube and being attached to and movable with said shaft when said fingerpull is moved toward and away from said hand grip;
a hollow cylindrical cap having a bifurcated front end and a rear end removably connected to said first tube; and
(B) a fishhook gripping mechanism comprising:
first and second jaws having front ends and angularly rear ends, said jaws being pivotally attached to each other by a first hinge pin, said jaws having aligned fishhook gripping surfaces of first predetermined thickness adjacent their front ends, each of said jaws having a predetermined reduced thickness adjacent its rear end so as to enable said jaws to cross and overlay each other at said first hinge pin;
a first link having a front end pivotally connected by a second hinge pin to the rear end of said first jaw, and a second link having a front end pivotally connect by a third hinge pin to the rear end of said second jaw, said first and second links being pivotally connected to each other by a fourth hinge pin connected to said front end of said shaft so that moving said fingerpulls toward said hand grip moves said rear ends of said links away from said first hinge pin and draws said rear ends of said first and second jaws toward each other enabling said front end of said jaws to pivot toward each other and grip a fishhook therebetween.

9. A fishhook disgorger as defined in claim 8, further comprising: said first hinge pin being anchored in said cap and said jaws crossing over each other inside of said cap, each jaw including a lever arm extending past said first hinge pin at an angle to its fishhook gripping surface.

10. A fishhook disgorger as defined in claim 8, further comprising: said fourth hingepin being anchored in said shelves protruding from said front end of said shaft.

11. A fishhook disgorger as defined in claim 8, further comprising: said rear end of said cap being threaded, a threaded circular ring circumscribing said front end of said tube and engaging the threads on said cap so as to connect said cap to said tube.

12. A fishhook disgorger as defined in claim 11, further comprising: said front end of said tube terminating in a peripheral abutment surrounding said front end and said circular ring contacting one surface of said abutment and holding said end cap against an opposite surface said abutment.

13. A fishhook disgorger as defined in claim 8, further comprising: said jaws having sharpened edges for cutting fishing line.

* * * * *